United States Patent [19]

Murata et al.

[11] Patent Number: 5,650,132
[45] Date of Patent: Jul. 22, 1997

[54] PROCESS FOR PRODUCING HYDROGEN FROM HYDROCARBON

[75] Inventors: Kazuhisa Murata; Hirobumi Ushijima; Ken-ichi Fujita, all of Tsukuba, Japan

[73] Assignee: Director-General of Agency of Industrial Science and Technology, Japan

[21] Appl. No.: 568,563

[22] Filed: Dec. 7, 1995

[30] Foreign Application Priority Data

Dec. 14, 1994 [JP] Japan .................................. 6-310293

[51] Int. Cl.$^6$ .................................................. C01B 3/26
[52] U.S. Cl. ..................... 423/650; 423/651; 423/445 B; 585/943
[58] Field of Search ........................... 423/650, 651; 585/943, 534

[56] References Cited

U.S. PATENT DOCUMENTS

| | | | |
|---|---|---|---|
| 2,805,177 | 9/1957 | Krebs | 423/651 |
| 4,447,665 | 5/1984 | Wennerberg | 585/379 |
| 5,164,054 | 11/1992 | Cha et al. | 423/650 |
| 5,336,828 | 8/1994 | Malhotra et al. | 585/654 |

FOREIGN PATENT DOCUMENTS

| | | | |
|---|---|---|---|
| 649646 | 2/1979 | U.S.S.R. | 423/650 |
| 380893 | 9/1932 | United Kingdom | 423/651 |

*Primary Examiner*—Gary P. Straub
*Assistant Examiner*—Peter DiMauro
*Attorney, Agent, or Firm*—Lorusso & Loud

[57] ABSTRACT

Hydrogen is produced from a hydrocarbon by contacting the hydrocarbon with fine particles of a carbonaceous material having an external surface area of at least 1 m$^2$/g at a temperature sufficient to pyrolyze the hydrocarbon.

9 Claims, No Drawings

PROCESS FOR PRODUCING HYDROGEN FROM HYDROCARBON

BACKGROUND OF THE INVENTION

This invention relates to a process for the production of hydrogen from a hydrocarbon.

Hydrogen is now used in various applications as a raw material for ammonia, methanol, etc. and as an energy source. Hydrogen has been produced by the steam reforming or partial oxidation of a hydrocarbon such as methane. This method, however, yields carbon dioxide as a by-product which should not be discharged to the atmosphere for the prevention of warming of the earth.

A method has been proposed for the production of hydrogen without yielding carbon dioxide, which includes pyrolyzing a hydrocarbon such as methane in the presence of nickel catalyst supported on silica (Proceedings of The 72th Catalyst Symposium, page 190 (1993)). In this method, the hydrocarbon is pyrolyzed into hydrogen and solid carbon. The carbon formed in situ deposits on the nickel catalyst to cause poisoning. Further, when $CO_2$ is introduced into the reaction system for converting the carbon deposits into CO, the catalytic activity of the nickel catalyst is considerably reduced by $CO_2$.

SUMMARY OF THE INVENTION

It is, therefore, an object of the present invention to provide a process which can convert a hydrocarbon such as a natural gas into hydrogen without producing $CO_2$.

Another object of the present invention is to provide a process of the above-mentioned type in which the problem of catalytic poisoning is not serious.

In accomplishing the foregoing objects, there is provided in accordance with the present invention a process for the production of hydrogen from a hydrocarbon, including contacting the hydrocarbon with fine particles of a carbonaceous material having an external surface area of at least 1 $m^2/g$ at a temperature sufficient to pyrolyze the hydrocarbon.

The term "external surface area" used in the present specification and the appended claims is intended to refer to the specific surface area of carbonaceous particles exclusive of inside surfaces in pores thereof.

Other objects, features and advantages of the present invention will become apparent from the detailed description of the preferred embodiments to follow.

DETAILED DESCRIPTION OF THE PREFERRED EMBODIMENTS OF THE INVENTION

In the process of the present invention, hydrogen is produced by thermal decomposition of a hydrocarbon using, as a catalyst, fine particles of a carbonaceous material having an external surface area of at least 1 $m^2/g$, preferably at least 2 $m^2/g$, more preferably 4–100 $m^2/g$. The average particle size of the particulate carbonaceous catalyst is generally 0.01–100 μm, preferably 0.05–50 μm. The particulate carbonaceous catalyst generally contains carbon in an amount of at least 90% by weight.

The carbonaceous material may be, for example, soot obtained during combustion of a fuel such as wood, coal or a petroleum oil; carbon nanotubes; finely particles of activated carbon or charcoal; polymeric carbon such as $C_{60}$ or $C_{70}$; soot obtained during arc discharge between carbon electrodes; soot obtained during thermal decomposition of organic compounds; and finely divided diamond.

For reasons of catalytic activity and easiness in manufacture, the use of soot obtained during arc discharge between carbon electrodes or during thermal decomposition of organic compounds is preferred. These preferred carbonaceous catalysts will be described in detail below.

When a DC potential is applied between an anode and a cathode each made of carbon such as graphite and disposed in a reaction vessel maintained in an inert gas atmosphere, an arc discharge occurs with the simultaneous formation of soot. Depending upon the intensity of the DC potential applied between the electrodes, the degree of vacuum, etc., the soot may contain carbon nanotubes or polymeric carbon such as $C_{60}$ and $C_{70}$. Such soot as obtained or after purification may be suitably used for the purpose of the present invention. The use of soot containing 1–50% by weight of $C_{60}$ is particularly preferred for reasons of high catalytic activity. The method for the production of $C_{60}$ is known in the art and is disclosed, for example, in W. Krätschmer, L. D. Lamb, K. Fostiropoulos, D. R. Huffman, Nature, 347, 354 (1990).

When an organic substance is thermally decomposed in vacuum or in an inert atmosphere at a temperature of 500°–2,000° C., a carbonaceous material in the form of soot is obtained. Such soot as obtained or after purification may be suitably used for the purpose of the present invention.

Any organic substance may be used as a precursor of the carbonaceous material. Examples of organic substances include (a) relatively low molecular weight substances such as hydrocarbons, halogenated hydrocarbons, nitrogen-containing organic compounds, oxygen-containing organic compounds, phosphorus-containing organic compounds, sulfur-containing organic compounds, boron-containing organic compounds and selenium-containing organic compounds and (b) polymeric substances such as polymers or copolymers of aromatic compounds and polymers or copolymers of α,β-unsaturated compounds.

Illustrative of suitable hydrocarbons and halogenated hydrocarbons are pentane, octane, dodecane, dimethylpropane, dimethylbutane, cyclohexane, cyclododecane, adamantane, norbornane, benzene, toluene, naphthalene, chloropropyl and chlorocyclohexane.

Illustrative of suitable nitrogen-containing organic compounds are aliphatic amines such as ethylamine, diethylamine, triethylamine, n-butylamine, ethylenediamine and propanediamine; aromatic amines such as aniline, toluidine and methylaniline; and aza compounds such as 1,4,8,11-tetraazaundecane, 1,5,8,12-tetraazadodecane, 1,5,9,13-tetraazatridecane, 1,4,8,11-tetraazacyclotetradecane and 1,4,8,12-tetraazacyclopentadecane.

Illustrative of suitable oxygen-containing organic compounds are aliphatic alcohols such as ethanol and propanol; alicyclic alcohols such as cyclohexanol, cyclododecanol and adamantanol; aromatic alcohols such as phenol and bisphenol; ketones; aldehydes; esters; ethers and carboxylic acids.

Illustrative of suitable phosphorus-containing organic compounds are phosphine and phosphine compounds having one or more substituents such as an alkyl group, a phenyl group, an alkoxy group, a hydroxyl group, a halogen group and an amino group, e.g. triethylphosphine, triphenylphosphine, triethoxyphosphine, trihydroxyethylphosphine, trichloromethylphosphine, triaminoethylphosphine and 1,2-bis(diphenylphosphino) ethane.

Illustrative of suitable sulfur-containing organic compounds are mercaptans such as ethyl mercaptan and propyl mercaptan; dithiols such as ethylene thioglycol and 1,2- propanedithiol; dialkylsulfides such as dipropyl disulfide; and thiophene compounds such as thiophene and dibenzothiophene.

Illustrative of suitable boron-containing organic compounds are borane, triethylborane, tributylborane, tri-n-butyl borate and chlorodiethylborane.

Illustrative of suitable selenium-containing organic compounds are dimethyl selenide and diethyl selenide.

The above relatively low molecular weight substances (a) preferably have a molecular weight of 500 or less, more preferably 16-300.

Illustrative of suitable polymers of aromatic compounds of the polymeric substances (b) are those of an aromatic aldehyde such as a hydroxybenzaldehyde, a hydroxyphthaladehyde or a hydroxynaphthoaldehyde.

Illustrative of suitable polymers of aromatic compounds are those of hydroxybenzaldehydes, hydroxyphthaldehydes or hydroxynaphthaldehydes. Illustrative of suitable copolymers of aromatic compounds are those of an aromatic substance with an aromatic aldehyde. The aromatic substance may be, for example, phenol, naphthalene, anthracene, phenanthrene, pyrene, indol, carbazole, thiophene or a derivative or mixture thereof. The aromatic aldehyde to be copolymerized with the aromatic substance may be, for example, benzaldehyde, naphthaldehyde, anthracenaldehyde, pyrenaldehyde, or a derivative or mixture thereof.

Illustrative of suitable polymers and copolymers of $\alpha,\beta$-unsaturated compounds are those of $\alpha,\beta$-unsaturated nitriles, $\alpha,\beta$-unsaturated alcohols, $\alpha,\beta$-unsaturated carboxylic acids, halogenated vinyl compounds, nitrogen-containing vinyl compounds, vinyl aromatics, vinyl ethers, olefins or acetylene polymers. Typical examples of the $\alpha,\beta$-unsaturated compounds include acrylonitrile, vinyl alcohol, methyl acrylate, butadiene, vinyl chloride, vinyl acetate, styrene, methyl vinyl ether, vinylpyrrolidone, vinylpyridine, ethylene and propylene.

The above polymeric substances (b) may be used in conjunction with an inorganic or an organometallic substances including carbon materials such as activated carbon, graphite and mesophase pitch; silicon materials such as silicon powder, silicon carbide, silicon nitride and silica; aluminum materials such as aluminum powder, aluminum carbide, aluminum nitride and alumina; boron materials such as boron carbide and boron nitride; titanium materials such as titanium powder and titania; organosilicon materials such as polymethylsilane, ethyl silicate, triethylsilane and triphenylsilane; organoaluminum materials such as aluminum isopropoxide and triethylaluminum; organic polymers such as polyacrylonitrile, polyvinylpyridine, polyethylene, polyamide, polyimide and phenol-formamide resins; and natural polymers such as starch, chitin, cellulose, keratin, lignin, gelatin and casein.

The above organic substance is heated in vacuum (generally 1-50,000 Pa, preferably 10-5,000 Pa) or in the atmosphere of an inert gas such as nitrogen or argon (generally at a feed rate of 5-1,000 cm³/minute, preferably 10-300 cm³/minute) at a temperature of 500°-2,000° C., preferably 800°-1,300° C., so that the organic substance is thermally decomposed into a carbonaceous material used as a catalyst in the process of the present invention.

If desired, the carbonaceous material thus obtained by thermal decomposition of the organic substance is treated with an oxidizing agent such as CO, $CO_2$ or $H_2O$ at a temperature of generally 300°-1,500° C., preferably 600°-1,100° C. to activate the surfaces of the carbonaceous particles. The above surface treatment may be carried out by contacting the carbonaceous particles with a gas containing 1-100 volume %, preferably 5-50 volume % of the oxidizing agent (balance being an inert gas such as nitrogen or argon).

The carbonaceous material does not contain such heavy metals as contained in the conventional methane aromatization catalysts and is light in weight and able to be completely burnt after use. Therefore, the hydrogen producing process can be carried out in an advantageous manner.

The hydrocarbon used as a raw material for the production of hydrogen may be an aliphatic hydrocarbon such as methane, ethane, ethylene or propane, an alicyclic hydrocarbon such as cyclohexane or cyclopentane or an aromatic hydrocarbon such as benzene, toluene or xylene. These hydrocarbons may be used by themselves or as a mixture of two or more thereof. The use of a hydrocarbon which is liquid or gas at room temperature is desirable, though a solid hydrocarbon such as paraffin wax may be used.

In order to efficiently perform the pyrolysis of the hydrocarbon, it is desirable to dilute the hydrocarbon with an inert gas such as nitrogen, argon or helium so that the feed has a hydrocarbon content of 0.1-50% by volume, preferably 0.8-5% by volume. The pyrolysis is generally performed at a temperature of 200°-1,500° C., preferably 400°-1,200° C. The hydrocarbon feed is contacted with the catalyst for generally 0.01-1,000 seconds, preferably 0.1-50 seconds. It is advisable to maintain the oxygen concentration in the pyrolyzing zone as small as possible, generally below 0.1 volume %.

It is preferred that an oxidizing gas such as $H_2O$ or $CO_2$ be intermittently or continuously fed to the pyrolyzing zone for reasons of improving the catalyst life. As the pyrolysis proceeds, the catalyst gradually loses its catalytic activity due to deposition of small external surface carbonaceous material on the catalyst. By contacting the catalyst with the oxidizing gas, the carbon deposits are converted into CO as follows:

$$C+H_2O \rightarrow CO+H_2$$

$$C+CO_2 \rightarrow 2CO$$

The amount of the oxidizing gas is sufficient to maintain the desired catalytic activity and is generally 0.01-100 moles, preferably 0.1-50 moles, per mole of carbon contained in the hydrocarbon feed.

It is also preferred that the particulate carbonaceous catalyst be used as a mixture with heat resistant particles for reasons of (1) prevention of scattering of the catalyst particles, (2) prevention of clogging of the catalyst layer and (3) improvement of the transference of heat to the catalyst particles. The heat resistant particles are preferably nonporous particles of, for example, fused silica, quartz sand, fused alumina or boron nitride having a particle size which is generally 10-10,000 times, preferably 50-5,000 times as large as that of the particulate carbonaceous catalyst and which is generally in the range of 1-5,000 µm, preferably 50-1,000 µm. The heat resistant particles are used in an amount of generally 0.1-50% by volume, preferably 0.5-10% by volume based on the total volume of the heat resistant particles and the particulate carbonaceous catalyst.

The pyrolysis of the hydrocarbon in the presence of the particulate carbonaceous catalyst may be carried out using any conventionally used solid-gas contacting system. While a batch mode may be adopted, a continuous gas flow mode using a packed bed system, a moving bed system or recirculating fluidized bed system (such as disclosed in Chemical Engineering, (Kamiyama et al) December 1944) is preferable.

In one embodiment of the packed bed system, the particulate carbonaceous catalyst is supported between a pair of upper and lower filter layer, through which the hydrocarbon feed is passed. The catalyst layer is heated by a heater pipe disposed within the catalyst layer. In the case of the moving bed system, the catalyst is continuously displaced from one end to the other end of a reactor through which the hydrocarbon is passed. A portion of the catalyst is discharged from the other end with a fresh catalyst being supplied from the one end.

In the case of the recirculating fluidized bed system, a pair of juxtaposed, reaction and regeneration towers each containing a fluidized bed of the particulate carbonaceous catalyst are used. A hydrocarbon feed is introduced from the bottom of the reaction tower while a regeneration gas such as steam or $CO_2$ is fed from the bottom of the regeneration tower. A product gas is withdrawn overhead from the reaction tower, while a spent regeneration gas is withdrawn overhead from the regeneration tower. A pair of legs extend from an upper portion of each the towers to a lower portion of each of the other tower, so that the catalyst particles in an upper part of the fluidized bed in each tower flow down through respective legs to the lower portion of the other tower. Namely, the catalyst particles regenerated by contact with the regeneration gas in the regeneration tower are introduced through the corresponding leg into the bottom of the reaction tower. The catalyst particles in the upper part of the reaction tower on which carbon produced in situ by the pyrolysis of the hydrocarbon deposits are fed through the corresponding leg into the bottom of the regeneration tower. Thus, the process can be continuously carried out in an efficient manner.

The process according to the present invention gives the following merits:

(1) substantially no $CO_2$ by-product is formed;
(2) the hydrogen-forming reaction is not hindered by $CO_2$ used for regeneration of the catalyst; and
(3) the spent catalyst can be easily treated by, for example, combustion.

The following examples will further illustrate the present invention. In the examples, the external surface area is measured at 25° C. with Centrifugal Sedimentation-Type Particle Distrubution Measuring Device SA-CP3 (manufactured by Shimadzu Seisakusho Co., Ltd., Japan) using n-butanol as a solvent.

EXAMPLE 1

Particulate Carbonaceous Catalyst

Between a graphite anode and a graphite cathode disposed in a vacuum chamber, a direct current voltage was impressed, so that arc discharge occurred with the simultaneous formation of soot. This soot was used as a catalyst. The soot contained about 10% by weight of $C_{60}$ and had an external surface area of 38.0 $m^2/g$.

Pyrolysis

The above particulate carbonaceous catalyst (25 mg) was mixed well with 2 g of quartz sand having particle sizes ranging from 100 to 1,000 μm and the mixture was packed in a quartz reaction tube having an inside diameter of 12 mm with a pair of quartz wool packings being disposed on the both ends of the packed layer the mixture for supporting the layer in a middle of the reaction tube. The tube was placed in an electric oven. A mixed gas composed of 1.8% by volume of methane and 98.2% by volume of nitrogen was fed into the reaction tube and passed through the packed layer at a feed rate of 27 $cm^3$/minute. The temperature within the reaction tube was continuously raised at a rate of 6° C./minute to 950° C. and maintained at that temperature for 30 minutes while continuing the feed of the mixed gas. The product gas obtained at this point in time was sampled and analyzed by gas chromatography for the measurement the conversion (%) of methane and the yield (mole/minute) of hydrogen. The methane conversion C is calculated by the following equation:

$$C=(W-W')/W \times 100$$

where W represents an amount of the raw material methane and W' represents an amount of the unreacted methane. The results are summarized in Table 1.

EXAMPLE 2

Particulate Carbonaceous Catalyst

The soot used in Example 1 was employed.

Pyrolysis

The pyrolysis was carried out in the same manner as described in Example 1 except that the reaction temperature was increased from 950° C. to 1,050° C. The methane conversion and the hydrogen yield were as shown in Table 1.

EXAMPLE 3

Particulate Carbonaceous Catalyst

The soot used in Example 1 was employed.

Pyrolysis

The pyrolysis was carried out in the same manner as described in Example 1 except that the reaction temperature was increased from 950° C. to 1,100° C. The methane conversion and the hydrogen yield were as shown in Table 1.

EXAMPLE 4

Particulate Carbonaceous Catalyst

The soot used in Example 1 was employed.

Pyrolysis

The pyrolysis was carried out in the same manner as described in Example 1 except that a mixed feed composed of 8.0% by volume of methane and 92.0% by volume of nitrogen was used as a raw material feed. The methane conversion and the hydrogen yield were as shown in Table 1.

EXAMPLE 5

Particulate Carbonaceous Catalyst

Between a graphite anode and a graphite cathode disposed in a vacuum chamber, a direct current voltage was impressed, so that arc discharge occurred with the simultaneous formation of soot. The soot was washed with benzene to obtain a mixture composed of 90% by weight of $C_{60}$ and 10% by weight of $C_{70}$ and having an external surface area of 20.0 $m^2/g$.

Pyrolysis

The pyrolysis was carried out in the same manner as described in Example 1. The methane conversion and the hydrogen yield were as shown in Table 1.

EXAMPLE 6

Particulate Carbonaceous Catalyst

Between a graphite anode and a graphite cathode disposed in a vacuum chamber, a direct current voltage was impressed, so that arc discharge occurred with the simultaneous formation of carbon deposits on the cathode surface. The deposits were scraped and used as a catalyst. The deposits contained carbon nanotubes and had an external surface area of 1.3 m$^2$/g.

Pyrolysis

The pyrolysis was carried out in the same manner as described in Example 1. The methane conversion and the hydrogen yield were as shown in Table 1.

EXAMPLE 7

Particulate Carbonaceous Catalyst

Di-n-propylamine was thermally decomposed at 1,050° C. to obtain a carbonaceous material having an external surface area of 2.1 m$^2$/g. This material was used as a catalyst.

Pyrolysis

The pyrolysis was carried out in the same manner as described in Example 1. The methane conversion and the hydrogen yield were as shown in Table 1.

EXAMPLE 8

Particulate Carbonaceous Catalyst

Triethylborane was thermally decomposed at 1,050° C. to obtain a carbonaceous material having an external surface area of 1.1 m$^2$/g. This material was used as a catalyst.

Pyrolysis

The pyrolysis was carried out in the same manner as described in Example 1. The methane conversion and the hydrogen yield were as shown in Table 1.

EXAMPLE 9

Particulate Carbonaceous Catalyst

A mixture containing 0.1 mole of pyrene, 0.125 mole of benzaldehyde and 3.3 g of activated carbon was reacted in the presence of 5% by weight of p-toluenesulfonic acid at 160° C. for 10 hours under an argon stream to obtain a polymeric product. The polymeric product was heated at 1,000° C. for 24 hours under an argon stream to obtain a carbonaceous material having an external surface area of 2.5 m$^2$/g. This material was used as a catalyst.

Pyrolysis

The pyrolysis was carried out in the same manner as described in Example 1. The methane conversion and the hydrogen yield were as shown in Table 1.

EXAMPLE 10

Particulate Carbonaceous Catalyst

Commercially available activated carbon (ACTIVATED CARBON DARCO G-60 manufactured by Aldrich Inc.) was finely ground to a particle size of 1–10 μm. This material had an external surface area of 4.72 m$^2$/g and was used as a catalyst.

Pyrolysis

The pyrolysis was carried out in the same manner as described in Example 1. The methane conversion and the hydrogen yield were as shown in Table 1.

EXAMPLE 11

Particulate Carbonaceous Catalyst

Diamond was finely ground to a particle size of 1–100 μm. This material had an external surface area of 2.0 m$^2$/g and was used as a catalyst.

Pyrolysis

The pyrolysis was carried out in the same manner as described in Example 1. The methane conversion and the hydrogen yield were as shown in Table 1.

TABLE 1

| Example No. | Reaction Temperature (°C.) | Methane Conversion (%) | Hydrogen yield (mole/minute) |
| --- | --- | --- | --- |
| 1 | 950 | 64.6 | $3.26 \times 10^{-6}$ |
| 2 | 1,050 | 92.1 | $4.67 \times 10^{-6}$ |
| 3 | 1,100 | 96.8 | $4.93 \times 10^{-6}$ |
| 4 | 950 | 9.7 | $3.83 \times 10^{-6}$ |
| 5 | 950 | 39.5 | $2.16 \times 10^{-6}$ |
| 6 | 950 | 22.0 | $0.88 \times 10^{-6}$ |
| 7 | 950 | 42.3 | $1.14 \times 10^{-6}$ |
| 8 | 950 | 54.7 | $0.77 \times 10^{-6}$ |
| 9 | 950 | 37.0 | $1.60 \times 10^{-6}$ |
| 10 | 950 | 36.8 | $1.82 \times 10^{-6}$ |
| 11 | 950 | 35.0 | $1.45 \times 10^{-6}$ |

EXAMPLE 12

Example 2 was repeated in the same manner as described except that the mixed gas fed to the reactor was composed of 1.8% by volume of methane, 96.1% by volume of nitrogen and 2.1% by volume of carbon dioxide. The methane conversion was 71.8% and the hydrogen yield was $3.59 \times 10^{-5}$ mole/minute.

EXAMPLE 13

Example 2 was repeated in the same manner as described except that the mixed gas fed to the reactor was composed of 1.8% by volume of methane, 96.4% by volume of nitrogen and 1.8% by volume of water vapor. The methane conversion was 63.3% and the hydrogen yield was $3.88 \times 10^{-5}$ mole/minute.

EXAMPLE 14

Example 1 was repeated in the same manner as described except that ethane was substituted for the methane in the mixed gas. The ethane conversion was 100% and the hydrogen yield was $6.29 \times 10^{-5}$ mole/minute.

EXAMPLE 15

Example 1 was repeated in the same manner as described except that hexane was substituted for the methane in the mixed gas. The hexane conversion was 97.3% and the hydrogen yield was $2.02 \times 10^{-5}$ mole/minute.

COMPARATIVE EXAMPLE 1

Example 1 was repeated in the same manner as described except that commercially available quartz sand having a particle diameter of 100–1,000 μm was packed by itself in the reactor. The methane conversion was 4.8% and the hydrogen yield was $0.012 \times 10^{-5}$ mole/minute.

COMPARATIVE EXAMPLE 2

Example 1 was repeated in the same manner as described except that commercially available graphite particles having a particle diameter of 10–50 μm and an external surface area of 0.54 m$^2$/g were substituted for the soot. The methane conversion was 13.4% and the hydrogen yield was 0.48× 10$^{-5}$ mole/minute.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for the production of hydrogen from methane, comprising contacting said methane with fine particles consisting of a carbonaceous material obtained by arc discharge between carbon electrodes, and having an external surface area of at least 1 m$^2$/g, at a temperature above 500° C. but not exceeding 1500° C. and sufficient to pyrolyze said methane.

2. A process as claimed in claim 1, wherein said fine particles of a carbonaceous material has an average particle size of 0.01–100 μm.

3. A process as claimed in claim 1, wherein said fine particles of a carbonaceous material has an external surface area of at least 2 m$^2$/g.

4. A process as claimed in claim 1, wherein said fine particles of a carbonaceous material has an external surface area of 4–100 m$^2$/g.

5. A process as claimed in claim 1, wherein said fine particles of a carbonaceous material are those of soot containing 1–50% of $C_{60}$ carbon.

6. A process as claimed in claim 1 wherein said carbonaceous material is at least 90% by weight carbon.

7. A process as claimed in claim 1 wherein said carbonaceous material is capable of being completely combusted.

8. A process as claimed in claim 1 wherein said temperature is within the range of 900°–1500° C.

9. A process as claimed in claim 1 wherein said temperature is within the range of 400°–1200° C.

* * * * *